Nov. 16, 1937.  H. PAXTON  2,099,226
CLEAN-OUT
Filed May 31, 1935  2 Sheets—Sheet 1
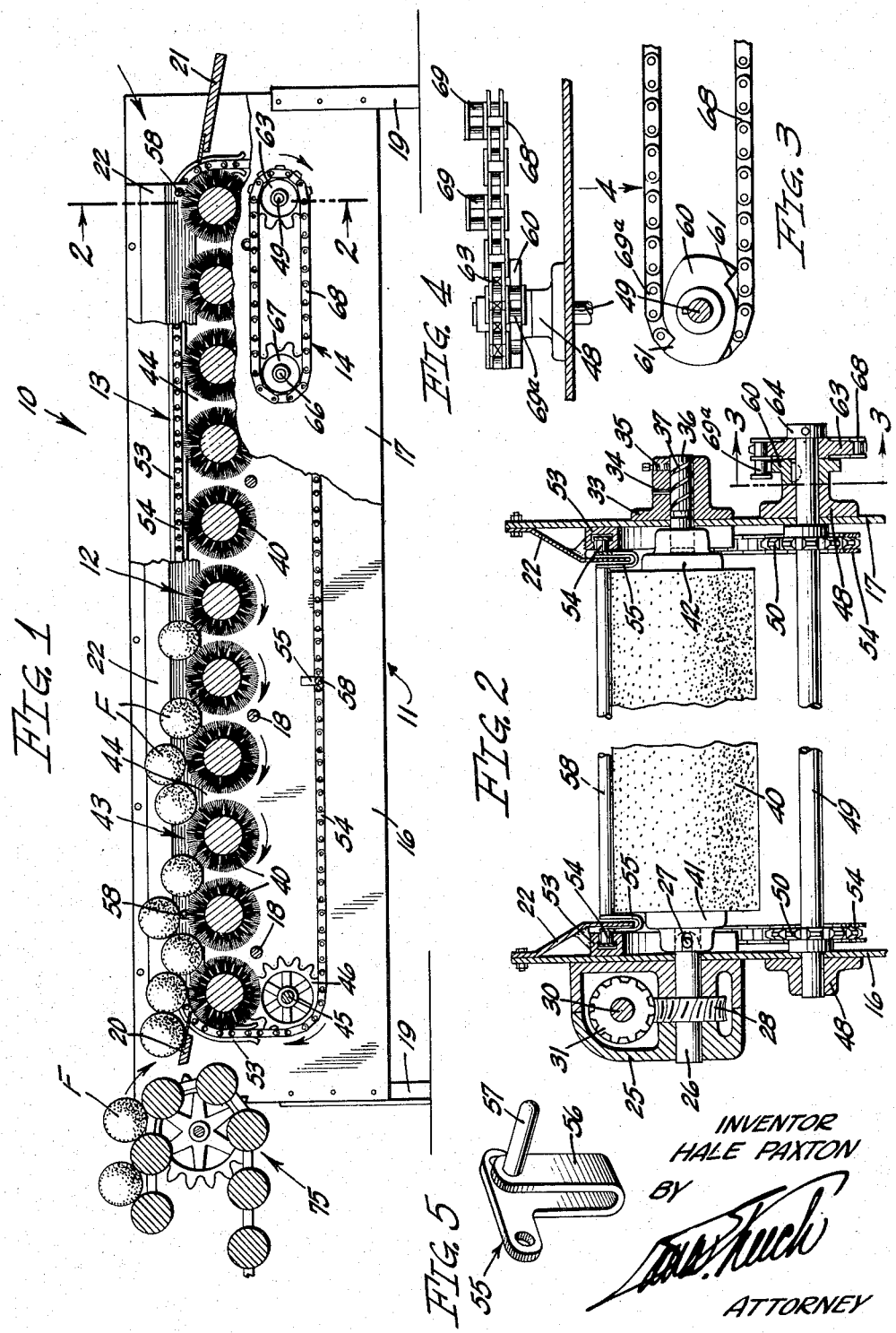
INVENTOR
HALE PAXTON
BY
*[signature]*
ATTORNEY

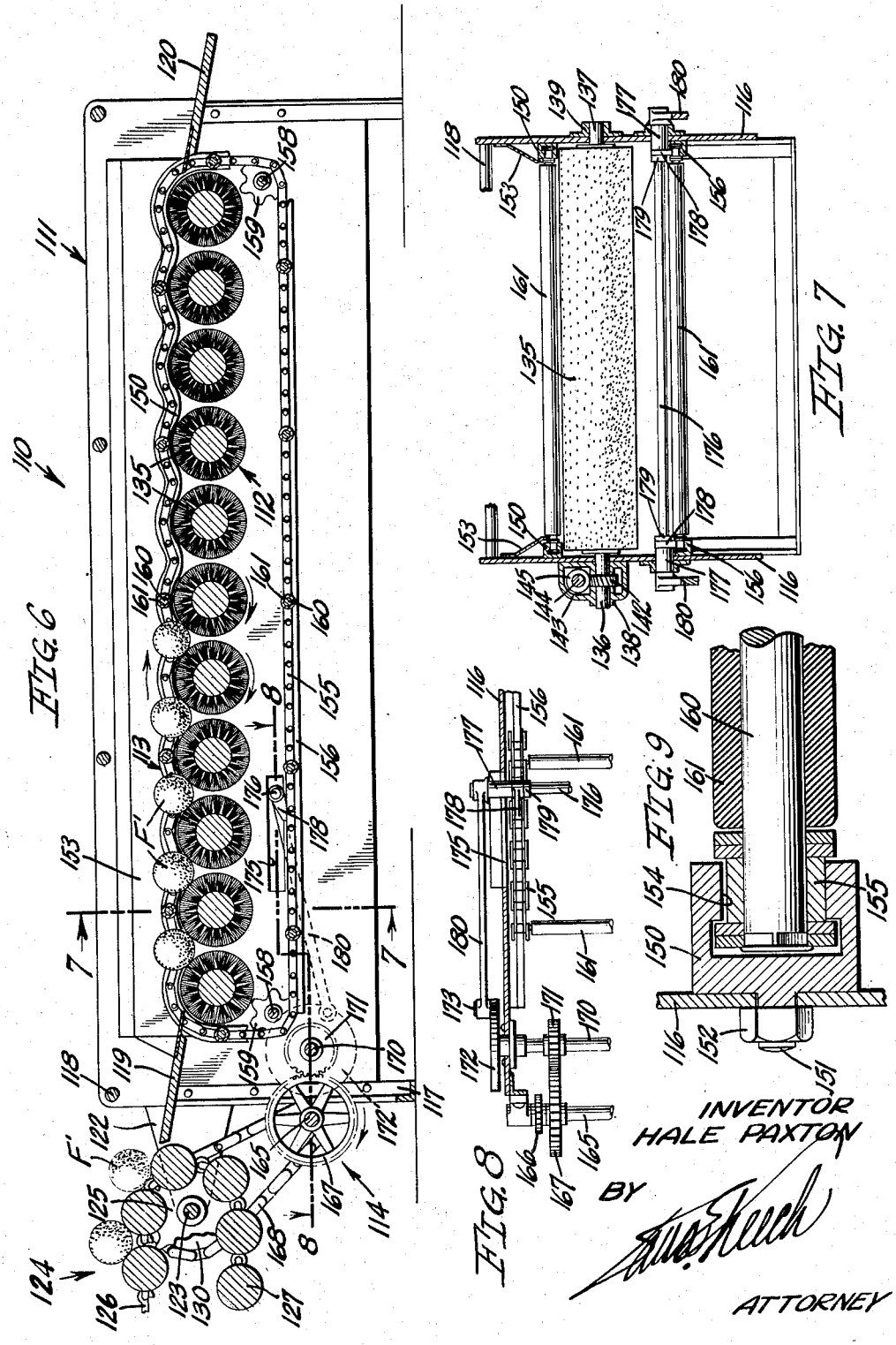

Patented Nov. 16, 1937

2,099,226

UNITED STATES PATENT OFFICE 2,099,226

CLEAN-OUT

Hale Paxton, Santa Ana, Calif., assignor, by mesne assignments, to Food Machinery Corporation, a corporation of Delaware Application May 31, 1935, Serial No. 24,187

15 Claims. (Cl. 146—202)

My invention relates to the preparation of agricultural produce for market and has particular reference to an improvement in machines for washing or otherwise treating citrus fruits and the like.

In the citrus packing industry, oranges, lemons, etc., are thoroughly washed to remove any dirt, scale or other surface impurities before the fruit is packed. A common type of machine used for the washing operation, known as the transverse brush washer, includes a frame in which a plurality of juxtaposed, cylindrical brushes are transversely mounted. The fruit is fed onto the rapidly rotating brushes and tends to remain in the channels or valleys between the brushes until being displaced by the feeding of additional fruit onto the brushes.

After washing a given lot of fruit, the aforesaid valleys remain full of fruit and means must be provided for removing this residual fruit before starting to wash another lot of fruit. The devices used for removing such residual fruit are commonly known as "clean outs".

It is an object of my invention to provide an improved clean out mechanism for use on transverse brushers of the type above referred to.

Another object is to provide a clean out which is inexpensive to make and economical in upkeep.

Clean outs in common use involve a considerable quantity of overhead mechanism disposed above the brushes. Such mechanism is in the way and unsightly.

It is a further object of my invention to provide a clean out which eliminates such overhead mechanism.

Continuous operation of such clean outs is also often desirable to prevent excessive brushing of the fruit where the quantities of fruit fed to the machine are insufficient to cause it to pass at a normal rate through the machine without assistance. Where a clean out operates in this manner, and it becomes necessary, as frequently happens, to substantially increase the rate of feeding the fruit to the machine, the fruit crowds itself through the brusher at a greater speed than that at which the clean out travels.

A further object of my invention is to provide a clean out mechanism for a transverse brush fruit washer that may be operated continuously during the operation of the washer without impeding the progress of the fruit through the washer when the fruit tends to travel at a greater rate of speed than the rate of speed of the clean out.

In the effort to develop a simple clean out mechanism, I have found many obstacles in the way of utilizing a compact clean out member disposed parallel with the axes of the brushes and traveling along the path followed by the fruit passing through the machine.

It is therefore an object of my invention to provide such a simplified clean out mechanism which will be practical.

One of the most difficult problems met with in developing such a simplified clean out mechanism is the tendency of fruit to creep between the member and the brushes away from which the clean out member is travelling.

A further object of my invention is to provide such a simplified clean out mechanism in which the fruit is unable to creep between the clean out members and the brushes as aforestated.

Another object of my invention is to provide a simple drive mechanism for moving a clean out member over the brushing surface of a washer with an intermittent movement.

A further object of my invention is to provide a mechanism for imparting an intermittent movement to a clean out member by means of which the period of rest between movements of the clean out member may be readily lengthened or shortened.

Yet another object of my invention is to provide a clean out having novel means for protecting the fruit from lubricant used on the mechanism actuating said clean out.

Other objects and advantages will become apparent in the following description taken in connection with the accompanying drawings, in which:

Fig. 1 is a side view, partly in elevation and partly in section, showing a preferred embodiment of my invention.

Fig. 2 is an enlarged, fragmentary, vertical sectional view taken on the line 2—2 of Fig. 1.

Fig. 3 is a vertical sectional view taken on the line 3—3 of Fig. 2.

Fig. 4 is a plan view looking in the direction of the arrow of Fig. 3.

Fig. 5 is a detail, perspective view of a part included in the preferred embodiment of my invention.

Fig. 6 is a longitudinal, sectional view of a modified form of my invention.

Fig. 7 is a vertical sectional view taken on the line 7—7 of Fig. 6.

Fig. 8 is a fragmentary, horizontal sectional view taken on the line 8—8 of Fig. 6.

Fig. 9 is an enlarged, detail, sectional view of a portion of the structure shown in Fig. 7.

Referring specifically to the drawings and particularly to Figs. 1 to 5 inclusive, I have shown therein a fruit brusher 10, comprising a preferred embodiment of my invention, this brusher including a frame 11, a brushing unit 12, a clean out mechanism 13 and a clean out drive unit 14.

The frame 11 includes side plates 16 and 17 secured in spaced relation by transverse tie rods 18, and supported by suitable legs 19. Mounted at opposite ends of the frame 11 are inlet and outlet drop boards 20 and 21 respectively, as shown in Fig. 1. Fixed on the inside of each of the plates 16 and 17 along the upper edges thereof are sheet metal aprons 22.

The brushing unit 12 includes a gear housing 25 fixed to the side plate 16 as shown in Fig. 2. Journalled in the housing 25 are stub shafts 26 having pins 27 fixed in the ends thereof, and spiral gears 28 keyed centrally thereon. Journalled in the housing 25 above the shaft 26 is a drive shaft 30 having gears 31 keyed thereon, the gears 31 meshing with the gears 28 of the shafts 26. Mounted on the plate 17 are bearings 33 having pins 34 and set screws 35 provided therein. Carried by the bearings 33 are studs 36 having spiral grooves 37 into which the pins 34 extend. The studs 36 are disposed in axial alignment with the shafts 26 and are retained in the bearings 33 by the set screws 35.

Mounted transversely between the plates 16 and 17 are cylindrical brushes 40 having attachments 41 and 42 on opposite ends thereof. The attachments 41 are bored to receive the inner ends of the studs 36. The uppermost sides of the brushes 40 provide a brushing surface 43 characterized by a series of valleys 44 therebetween.

The clean out mechanism 13 includes an idle shaft 45 journalled in suitable bearings (not shown) on the plates 16 and 17 adjacent the inlet end of the brusher 10. Fixed on the shaft 45 adjacent the inner faces of the plates 16 and 17 are sprockets 46. Journalled in bearings 48 at the opposite end of the brusher 10 is a shaft 49 having sprockets 50 fixed thereon, the latter being radially aligned with the sprockets 46 of the shaft 45.

Welded or otherwise secured to the aprons 22 are chain guide tracks 53 as shown in Figs. 1 and 2. Trained about the sprockets 46 and 50 are endless chains 54, the upper flights thereof being slidably received by the guide tracks 53. Fixed on each of the chains 54 are three special links 55 formed as shown in Fig. 5 to provide a U-shaped portion 56 and an inward extending stud 57. The U-shaped portions 56 of the links 55 are for the purpose of providing clearance for the lower portions of the aprons 22, the latter extending downward below the chains 54 to protect the fruit from grease used to lubricate the chains 54 and guide tracks 53. Extending transversely between the chains 54 are tubular bars 58 supported at their opposite ends by the studs 57 of the links 55 as shown in Fig. 2. The bars 58 are relatively small in diameter and disposed to travel over the brushes 40 in close proximity with the crests thereof.

The clean out drive unit 14 includes a ratchet wheel 60 keyed to the shaft 49 as shown in Fig. 2, the wheel 60 having a pair of teeth 61 as seen in Fig. 3. Rotatably mounted on the shaft 49 adjacent the ratchet wheel 60 is an idle sprocket 63 which is retained in position by a collar 64. Journalled transversely of the frame 11 is a shaft 66 having a sprocket 67 fixed thereon, the sprocket 67 being radially aligned with the sprocket 63.

The shaft 49 is driven continuously by any suitable source of power (not shown). Trained about the sprockets 63 and 67 is a chain 68 having supplementary links 69 provided thereon as shown in Fig. 4. The supplementary links 69 have no function when disposed on the outside of the chain 68. However, when positioned on the inside of the chain as shown by the link indicated at 69a, these supplementary links are in position to engage one of the teeth 61 of the ratchet wheel 60. One or more of the links 69 may be positioned as links 69a on the inside of the chain 68, it being clear that the shaft 49 remains stationary while the sprockets 63 and 67 are rotating until a link 69a engages one of the teeth 61 of the wheel 60, at which time a semi-revolution is given the shaft 49. Any desired number of such semi-revolutions may be given the shaft 49 for each complete revolution of the chain 68, depending upon the number of the links 69 positioned as links 69a on the inside of the chain 68.

Operation

The brusher 10 operates in the following manner. The brushes 40 are rotated continuously at a relatively high rate of speed and preferably from 180 to 250 R. P. M. in the direction indicated by the arrows of Fig. 1, the brushes 40 being driven by the drive shaft 30 which is rotated by any suitable source of power (not shown). The shaft 66 is driven continuously, causing the link 69a to intermittently contact one of the teeth 61 of the ratchet wheel 60. When the wheel 60 is rotated, the shaft 49 is driven thereby causing intermittent movement of the chains 54 of the clean out mechanism 13. The bars 58 carried by the chains 54 are thus moved intermittently across the brushing surface 43 from left to right as viewed in Fig. 1. The bars 58 move the distance between the centers of two adjacent brushes and stop between movements in vertical alignment with the axis of the brushes 40 therebeneath.

Fruit, indicated at F, is fed onto the inlet board 20 by a suitable delivery conveyor 75 and gravitates onto the brushing surface 43. The pieces of fruit remain in the valleys 44 and are rotated by the brushes 40 until being crowded out by additional fruit. Thus, as long as fruit is being fed to the brusher 10 by the conveyor 75, the progress of the fruit F through the machine adapts itself to the rate of delivery of fruit by the conveyor 75. If the rate of delivery of fruit slows up until it is less than the net forward velocity of the clean out bars 58, the progress of the fruit through the machine thereupon depends upon said clean out bars and conforms to said net velocity of said bars. When the delivery of fruit to the washer 10 exceeds said net velocity, the fruit no longer depends for advancement on the clean out bars 58, but crowds over these bars as shown in Fig. 1. This is made possible by the small diameter of the bars 58 and their close proximity with the brushing surface 43 when said bars are halted.

After passing through the brusher 10, the fruit F rolls down the outlet board 21 out of the machine. After the delivery to the brusher 10 of a given lot of fruit is completed and the conveyor 75 is emptied, the residual fruit resting in the valleys 44 remains there until contacted by the bars 58, the latter urging the residual fruit from valley to valley until the brusher 10 is completely cleaned out and ready for the next lot of fruit.

As hereinbefore noted, it is one of the objects of this invention to prevent fruit creeping between the clean out members 58 and the brushes 40. This is accomplished by causing the clean out members 58 to travel from crest to crest of adjacent brushes at such a rate of speed that no pieces of fruit under normal operation of the machine can overtake the clean out members during such movement, so as to rest both against the clean out member and the brushes away from which the latter is travelling. It has been found in practice that where this speed of the clean out member in its crest to crest movement is equal to the maximum average velocity of fruit travelling through the machine, that this purpose will be effected. Thus, where the maximum capacity of the machine is one hundred and twenty valleys per minute, which means a maximum average velocity of fifty feet per minute for the fruit travelling through the machine, it is preferable that the velocity of the clean out members in each individual crest to crest movement shall be substantially fifty feet per minute.

The pausing of the bars 58 over the crest of each brush is made necessary to permit fruit to be fed through the machine at less than the maximum rate of travel when this should be desired, and yet secure the advantages of a greater amount of brushing of the fruit than where the latter travels through the machine at its maximum velocity. It should be noted, therefore, that whatever the maximum average velocity of the fruit through the machine may be, the important thing is for the clean out members 58 to travel in their crest to crest movements at a sufficient velocity so that fruit is not fed over from the valley immediately to the rear of such members into a position where such fruit rests upon both the clean out member and the brushes away from which it was travelling. The requirements as to the velocity of the clean out member will materially vary with the character of fruit handled, the relative diameters of the fruit and brushes and the speed of rotation of the brushes. In the embodiment illustrated, the brushes preferably rotate between 150 and 250 R. P. M.

Referring now to Figs. 6 to 9 inclusive of the drawings, I have shown therein a modified form of brusher 110 which includes a frame 111, a brushing unit 112, a clean out mechanism 113 and a power transmitting mechanism 114.

The frame 111 includes a pair of spaced side walls 116 supported by legs 117 and maintained in spaced relation by transverse rods 118. Mounted on opposite ends of the frame 111 are inlet and outlet drop boards 119 and 120 respectively. Mounted on the inlet end of the frame 111 are bearing brackets 122, one of these being shown in Fig. 6. Journalled in the bearings 122 is a shaft 123 of a conventional type of delivery conveyor 124, the latter including a pair of sprockets 125 about which chains 126 are trained, these carrying rollers 127. Fixed on the shaft 123 adjacent one of the sprockets 125 is a similar sprocket 130, a portion of which is shown in Fig. 6. The purpose of the sprocket 130 will be pointed out hereinafter.

The brushing unit 112 includes a plurality of transverse brushes 135 rotatably mounted in the frame 111 by means of trunnions 136 and 137, the latter being journalled in suitable bearings 138 and 139 respectively as shown in Fig. 7. Keyed on the trunnion 136 is a spiral gear 142. Formed integral with each of the bearings 138 is a housing 143, the latter providing suitable bearings for a drive shaft 144 upon which spiral gears 145 are fixed, the latter meshing with the gears 142 as shown. The shaft 144 is driven by any suitable means (not shown) and by means of the gears 142 and 145 causes the brushes 135 to rotate.

The clean out mechanism 113 includes a pair of chain guide tracks 150, these preferably being shaped to substantially conform to the upwardly disposed surfaces of the brushes 135 as shown in Fig. 6. The guide tracks 150 are mounted on the side walls 116 by studs 151 and nuts 152.

Fixed on the side walls 116 above the guide tracks 150 are guard plates 153 to prevent fruit from coming in contact with the guide tracks 150, the lower edges of the plates 153 being shaped to conform to the contour of the guide tracks 150. The guide tracks 150 are formed to provide guide grooves 154, these being of sufficient size and shape to slidably receive the upper flights of roller chains 155 as shown in Figs. 7 and 9. The lower flights of the chains 155 travel on suitable angle iron bars 156 fixed to the side walls 116 of the frame 111. At each end of the bars 156 are shafts 158 on which sprockets 159 are mounted, the chains 155 being trained about the sprockets 159 as shown in Fig. 6. Extending from one of the chains 155 to the other at regularly spaced intervals are rods 160. These rods are preferably provided with rubber jackets 161 and are non-rotatable relative to the chains 155.

The power transmitting mechanism 114 includes a transverse shaft 165 suitably journalled on the inlet end of the frame 111. Fixed on one end of the shaft 165 as shown in Fig. 8 is a sprocket 166 and a gear 167. The shaft 165 is driven by the conveyor shaft 123 by a chain 168, the latter being trained about the sprockets 130 and 166 as shown in Fig. 6. Journalled transversely of the frame 111 adjacent the shaft 165 is a similar shaft 170 upon which a gear 171 is keyed, the gear 171 being positioned to mesh with the gear 167 of the shaft 165. Fixed on opposite ends of the shaft 170 are discs 172 having crank pins 173 provided thereon.

As shown in Figs. 6, 7 and 9, the side walls 116 are formed to provide horizontal slots 175, these being located just above the lower flights of the chains 155. Extending through the slots 175 is a cross bar 176 upon each end of which a roller 177 is rotatably mounted, the rollers 177 being disposed within the slots 175. Loosely mounted on the bar 176 adjacent the rollers 177 are pawls 178, positioned to engage the chains 155 as shown in Fig. 8. The pawls 178 are retained in position on the bar 176 by collars 179. The bar 176 is reciprocated in the slots 175 by pitmans 180 which extend from the extremities of the bar 176 to the crank pins 173 of the discs 172.

The fruit brusher 110 of my invention operates in the following manner. The conveyor 124 is set in motion causing the shafts 165 and 170 to rotate, the bar 176 being continuously reciprocated by the pitmans 180. As the bar 176 moves rightward as viewed in Fig. 6, the pawls 178 idle over the chains 155, and as the bar 176 moves leftward, the pawls 178 engage with the chains 155 which are moved a sufficient distance to cause each of the rods 160 of the upper flights of the chains 155 to move from the crest of one of the brushes 135 to the crest of the next adjacent brush.

The delivery conveyor 124 and the clean out mechanism 113 are relatively timed so that the clean out is actuated just before a row of fruit F' is delivered by the conveyor 124 to the first pair of the rotating brushes 135. The intermittent action of the clean out 113 allows the fruit F' to remain in the channels between the pairs of brushes for a longer interval than if the clean out were moved continuously, it being noted that a more thorough brushing is given the fruit when the latter remains between two brushes and receives the scrubbing action of each. The clean out 113 feeds the fruit through the washer 110 at the same rate that the conveyor 124 travels. This prevents any possibility of fruit being fed from the conveyor onto the brushes at a rate sufficient to crowd the fruit forwardly against the feed rods 160. The continuing intermittent travel of the rods 160, however, assures the cleaning out of all fruit from the machine when the last of each separate lot of fruit is delivered from the conveyor 124 into the brusher.

I claim as my invention:

1. In a fruit brushing machine, the combination of: a frame; a plurality of juxtaposed, cylindrical brushes journalled transversely on said frame, the uppermost sides of said brushes forming a fruit brushing surface characterized by fruit receiving valleys one of which is disposed between each adjacent pair of said brushes; means for rotating said brushes in a common direction; a guide track at each side of said frame, said tracks conforming substantially to arcuate crest portions of the contour of said brushes; a transverse bar movable over said brushing surface, the ends of said bar being guided by said guide tracks at points disposed substantially on the axis of said bar; and power means for moving said bar over said brushing surface, said bar feeding fruit from valley to valley, said bar, when contacting fruit disposed in each of said valleys, urging said fruit onto the brush forming the advance wall of said valley, said fruit then rolling over said brush into the next of said valleys, said bar being returned to starting position in a plane out of the path of fruit on said brushing surface.

2. In a fruit brushing machine, the combination of: a frame; a plurality of juxtaposed, cylindrical brushes journalled transversely on said frame, the uppermost sides of said brushes forming a fruit brushing surface characterized by fruit receiving valleys, one of which is disposed between each adjacent pair of said brushes; means for rotating said brushes in a common direction; a guide track at each side of said frame, said tracks conforming substantially to arcuate crest portions of the contour of said brushes; a transverse bar movable over said brushing surface, the ends of said bar being received and guided by said guide tracks at points disposed substantially on the axis of said bar; and power means for intermittently and progressively moving said bar over said brushing surface, said bar being allowed to pause over the center of each of said brushes, said bar being returned to starting position along a path below said brushes.

3. In a fruit brushing machine, the combination of: a frame comprising a pair of spaced side members; a row of juxtaposed, cylindrical brushes journalled transversely between said side members; an endless chain on each of said side members, certain flights of said chains being disposed in a plane close to the uppermost sides of said brushes; a clean out bar carried by said chains, said bar being connected at its opposite ends to said chains by U-shaped fittings; an apron mounted on each of said frame side members, the lower edge portions of said aprons extending into said U-shaped fittings so as to separate said flights of said chains from said brushes to prevent contact of the fruit with said chains.

4. In a fruit brushing machine, the combination of: a frame; a plurality of juxtaposed, cylindrical brushes journalled transversely on said frame, the uppermost sides of said brushes forming a fruit brushing surface characterized by fruit receiving valleys between each pair of said brushes; means for driving each of said brushes in a common direction; a conveyor for delivering fruit to one end of said brushing surface; a guide track at each side of said frame, said tracks conforming substantially to arcuate crest portions of the contour of said brushes; a transverse bar movable over said brushing surface, the ends of said bar being received and guided by said guide tracks; and power means for moving said bar over said brushing surface, said bar feeding fruit from valley to valley from one end of said brushing surface to the other, said bar moving means being driven in timely relation with said delivery conveyor, said bar contacting fruit disposed in one of said valleys and urging said fruit onto the brush forming the advance wall of said valley, said bar being returned to starting position in a plane out of the path of fruit on said brushing surface.

5. In combination with a fruit treating machine of the type employing a series of treating rolls rotatable about fixed axes and arranged transversely to the flow of fruit thereover and in adjacent parallel relation to form fruit supporting valleys therebetween whereby fruit resting in each valley is dislodged therefrom by incoming fruit and caused to pass into the next valley: a cleanout bar disposed parallel with said rolls; guide means for guiding opposite ends of said bar to confine said bar to a path of travel through said machine which lies so close to the crests of said rolls that said fruit cannot pass between said bar and a roll when said bar is disposed over the crest of the latter; and power means self-controlled to move said bar along said path by intermittent movements separated by pauses, said power means causing said bar to halt over a crest of one of said rolls at the end of each such movement.

6. In combination with a fruit treating machine of the type employing a series of treating rolls rotatable about fixed axes and arranged transversely to the flow of fruit thereover and in adjacent parallel relation to form fruit supporting valleys therebetween whereby fruit resting in each valley is dislodged therefrom by incoming fruit and caused to pass into the next valley: a cleanout bar smaller in diameter than one-half the average diameter of said fruit, said bar being disposed parallel with said rolls; guide means for guiding opposite ends of said bar to confine said bar to a path of travel through said machine which lies so close to the crests of said rolls that said fruit cannot pass between said bar and a roll when said bar is disposed over the crest of the latter; and power means self-controlled to move said bar along said path by intermittent movements separated by pauses, said power means causing said bar to halt over a crest of one of said rolls at the end of each such movement.

7. In combination with a fruit treating machine of the type employing a series of treating rolls rotatable about fixed axes and arranged transversely to the flow of fruit thereover and in adjacent parallel relation to form fruit supporting valleys therebetween whereby fruit resting in each valley is dislodged therefrom by incoming fruit and caused to pass into the next valley: a cleanout bar disposed parallel with said rolls; guide means for guiding opposite ends of said bar to confine said bar to a path of travel through said machine which lies substantially tangent with the crests of said rolls so that said fruit cannot pass between said bar and a roll when said bar is disposed over the crest of the latter; and power means self-controlled to move said bar along said path by intermittent movements separated by pauses, said power means causing said bar to halt over a crest of one of said rolls at the end of each such movement.

8. In combination with a fruit treating machine of the type employing a series of treating rolls rotatable about fixed axes and arranged transversely to the flow of fruit thereover and in adjacent parallel relation to form fruit supporting valleys therebetween whereby fruit resting in each valley is dislodged therefrom by incoming fruit and caused to pass into the next valley: a cleanout bar smaller in diameter than one-half the average diameter of said fruit, said bar being disposed parallel with said rolls; guide means for guiding opposite ends of said bar to confine said bar to a path of travel through said machine which lies substantially tangent with the crests of said rolls so that said fruit cannot pass between said bar and a roll when said bar is disposed over the crest of the latter; and power means self-controlled to move said bar along said path by intermittent movements separated by pauses, said power means causing said bar to halt over a crest of one of said rolls at the end of each such movement.

9. In combination with a fruit treating machine of the type employing a series of treating rolls rotatable about fixed axes and arranged transversely to the flow of fruit thereover and in adjacent parallel relation to form fruit supporting valleys therebetween whereby fruit resting in each valley is dislodged therefrom by incoming fruit and caused to pass into the next valley: a cleanout bar smaller in diameter than one-half the diameter of said fruit, said bar being disposed parallel with said rolls; guide means for guiding opposite ends of said bar to confine said bar to a path of travel through said machine which lies so close to the crests of said rolls that said fruit cannot pass between said bar and a roll when said bar is disposed over the crest of the latter; and power means self-controlled to move said bar along said path by intermittent movements separated by pauses, said power means causing said bar to halt over a crest of one of said rolls at the end of each such movement, said cleanout bar being small enough so that when it is pausing over the crest of a roll, fruit normally progressing through said machine is able to pass over said bar from positions in which said fruit is contacting said roll directly behind said bar.

10. In combination with a fruit treating machine of the type employing a series of treating rolls rotatable about fixed axes and arranged transversely to the flow of fruit thereover and in adjacent parallel relation to form fruit supporting valleys therebetween whereby fruit resting in each valley is dislodged therefrom by incoming fruit and caused to pass into the next valley: a cleanout bar disposed parallel with said rolls; guide means lying substantially in the plane of the crests of said rolls for guiding opposite ends of said bar to confine said bar substantially in the plane of said guide means; and power means to move said bar along said guide means, said bar being small enough to permit fruit resting on the rolls to be advanced over the bar when said fruit is urged forward at a faster rate than the bar by the feed of additional fruit to the machine.

11. In combination with a fruit treating machine of the type employing a series of treating rolls rotatable about fixed axes and arranged transversely to the flow of fruit thereover and in adjacent parallel relation to form fruit supporting valleys therebetween whereby fruit resting in each valley is dislodged therefrom by incoming fruit and caused to pass into the next valley: a cleanout member disposed parallel with said rolls; fixed guide means for guiding opposite ends of said member along a path of travel through said machine over the crests of said rolls; chain means for causing movement of said member along said path of travel; means connecting said member to said chain means for rigid transmission of movement from said chain means through said member to said fruit; and power means self-controlled to move said chain means by intermittent movements separated by pauses, said power means causing said chain means to halt at the end of each such movement with said member disposed over the crest of one of said rolls.

12. In combination with a fruit treating machine of the type employing a series of treating rolls rotatable about fixed axes and arranged transversely to the flow of fruit thereover and in adjacent parallel relation to form fruit supporting valleys therebetween whereby fruit resting in each valley is dislodged therefrom by incoming fruit and caused to pass into the next valley: a cleanout bar disposed parallel with said rolls; guide means disposed substantially in the plane of the crests of said rolls; endless chains having one run over said rolls and one run beneath said rolls said upper runs being guided by said guide means; and means for attaching ends of said bar to said chains at points close to the axis of said bar and substantially in the horizontal plane of said bar for the rigid transmission of movement from said chains through said bar to the fruit resting on said rolls.

13. In combination with a fruit treating machine of the type employing a series of treating rolls rotatable about fixed axes and arranged transversely to the flow of fruit thereover and in adjacent parallel relation to form fruit supporting valleys therebetween whereby fruit resting in each valley is dislodged therefrom by incoming fruit and caused to pass into the next valley: a cleanout bar disposed parallel with said rolls; guide means disposed substantially in the plane of the crests of said rolls; endless chains having one run over said rolls and one run beneath said rolls said upper runs being guided by said guide means; means for attaching ends of said bar to said chains at points close to the axis of said bar and substantially in the horizontal plane of said bar for the rigid transmission of movement from said chains through said bar to the fruit resting on said rolls; and power means self-controlled to move said chains by intermittent movements separated by pauses, said power means causing said chains to halt at the end of each such movement with said bar disposed over the crest of one of said rolls.

14. In combination with a fruit treating machine of the type employing a series of treating rolls rotatable about fixed axes and arranged transversely to the flow of fruit thereover and in adjacent parallel relation to form fruit supporting valleys therebetween whereby fruit resting in each valley is dislodged therefrom by incoming fruit and caused to pass into the next valley; a cleanout bar disposed parallel with said rolls; power means to move said bar along a path closely adjacent the upper surfaces of the rolls to engage and advance fruit from valley to valley across said rolls; and means limiting upward movement of said bar to prevent fruit from passing between said bar and a roll when said bar is disposed over the crest of the latter, said bar being small enough to permit fruit resting on the rolls to be advanced over the bar when said fruit is urged forward at a faster rate than the bar by the feed of additional fruit to the machine.

15. In combination with a fruit treating machine of the type employing a series of treating rolls rotatable about fixed axes and arranged transversely to the flow of fruit thereover and in adjacent parallel relation to form fruit supporting valleys therebetween whereby fruit resting in each valley is dislodged therefrom by incoming fruit and caused to pass into the next valley; a cleanout bar disposed parallel to said rolls; carrier means for transmitting movement to said bar along the path of travel of fruit over said rolls so as to cause said bar to engage fruit in advance thereof and propel it through said machine, said means preventing substantial horizontal movement of said bar relative to the carrier means thus causing the movement of said carrier means to be substantially rigidly transmitted through said bar to said fruit, said bar being small enough to permit fruit resting on the rolls to be advanced over the bar when said fruit is urged forward at a faster rate than the bar by the feed of additional fruit to the machine.

HALE PAXTON.